United States Patent
Nguyen et al.

(10) Patent No.: US 10,879,659 B2
(45) Date of Patent: Dec. 29, 2020

(54) VARIABLE CONNECTION RETENTION SYSTEM

(71) Applicant: KARMA AUTOMOTIVE LLC, Irvine, CA (US)

(72) Inventors: Khanh Nguyen, Garden Grove, CA (US); Geng Niu, Irvine, CA (US)

(73) Assignee: KARMA AUTOMOTIVE LLC, Irvine, CA (US)

( * ) Notice: Subject to any disclaimer, the term of this patent is extended or adjusted under 35 U.S.C. 154(b) by 0 days.

(21) Appl. No.: 16/383,148

(22) Filed: Apr. 12, 2019

(65) Prior Publication Data

US 2020/0328567 A1 Oct. 15, 2020

(51) Int. Cl.
*H01H 37/52* (2006.01)
*H01R 25/16* (2006.01)

(52) U.S. Cl.
CPC .................. *H01R 25/162* (2013.01)

(58) Field of Classification Search
CPC .. H01H 85/143; H01H 85/2015; H01H 85/56; H01H 2085/2075; H01H 2085/208; B60R 16/0239; B60Y 2410/115; H01M 2/206; H01M 2/307; H01M 2/348; H01M 2200/103; H02G 3/081
USPC ......................................................... 337/188
See application file for complete search history.

(56) References Cited

U.S. PATENT DOCUMENTS

2018/0277328 A1* 9/2018 Kawarazaki ........... H01H 85/56

* cited by examiner

*Primary Examiner* — Phuong Chi Thi Nguyen
(74) *Attorney, Agent, or Firm* — Gordon Rees Scully Mansukhani, LLP

(57) ABSTRACT

A variable connection retention system for a busbar. The retention system comprises of a dielectric overmold base. A main busbar is nested within overmold and engages a mating busbar. The overmold base includes a floating retention nut that displaces axially which engages the main busbar to the mating busbar when torque is applied.

16 Claims, 6 Drawing Sheets

VARIABLE CONNECTION RETENTION SYSTEM

The present disclosure relates generally to the field of fastening and retention systems. More specifically, this disclosure relates to a variable connection retention system for busbar connection systems.

Busbars are used in various applications ranging from medium to high current distribution. It is typical for a busbar interface to be designed to accept a mating busbar of single uniform thickness. The single uniform thickness allows a design to be implemented to achieve desired clamp load at the busbar joint. Improper clamp load at a busbar joint can result in mechanical failure, high contact resistance leading to ohmic heating at the busbar joint, and loss of clamp load leading to a possible open circuit event. A busbar that acts as the Input/Output (IO) of an electronics device might interface with other current carrying busbars. It is because of this that uniform thickness of the mating busbar might not always be controlled. Busbars connection joints are typically designed with a retention feature on one of the two mating components. The retention feature is usually in the form of a retaining nut. If packaging constraint require the busbar system to accommodate busbar connections with varying thicknesses, measures must be in place to ensure that proper clamp load is achieved to reduce the failure mode at the busbar joint.

Accordingly, an object of the present disclosure is to provide a cost effective, space efficient, and relatively straightforward retention system. The retention system uses a floating retention nut capable of moving along a fastener length to accommodate varying connection thicknesses. The proposed strategy allows for varying thickness busbar I/O connections, lowers the risk of having sub optimum high voltage connection joints, and lowers cost by having one busbar I/O design capable of interfacing with different busbar thicknesses.

BRIEF DESCRIPTION OF THE DRAWINGS

The features, aspects, and advantages of the present invention will become apparent from the following description, and the accompanying exemplary embodiments shown in the drawings, which are briefly described below.

DETAILED DESCRIPTION

According to one embodiment of the disclosure, the retention system comprises a floating retention nut. The floating retention nut is configured to float axially to accommodate variable thicknesses in connections between two mating components. The floating retention nut also lowers the risk of having high voltage connection joints in electrical connections which would increase the contact resistance. High contact resistance are often the cause of poor performance in electrical devices such as power loss and unwanted heat generation.

Figure 1:
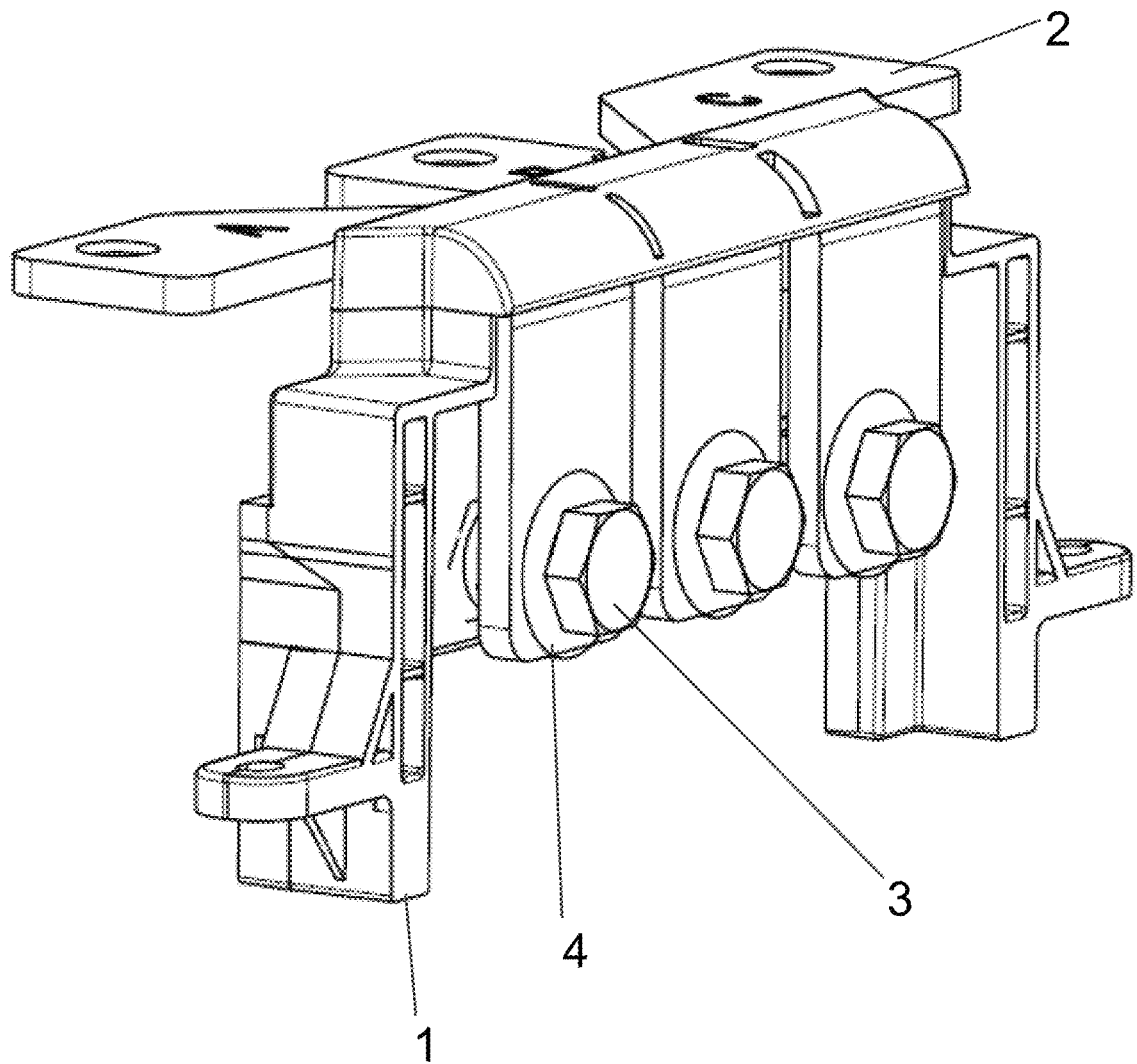
FIG. 1 is a front isometric view of the retention system.
Figure 2:
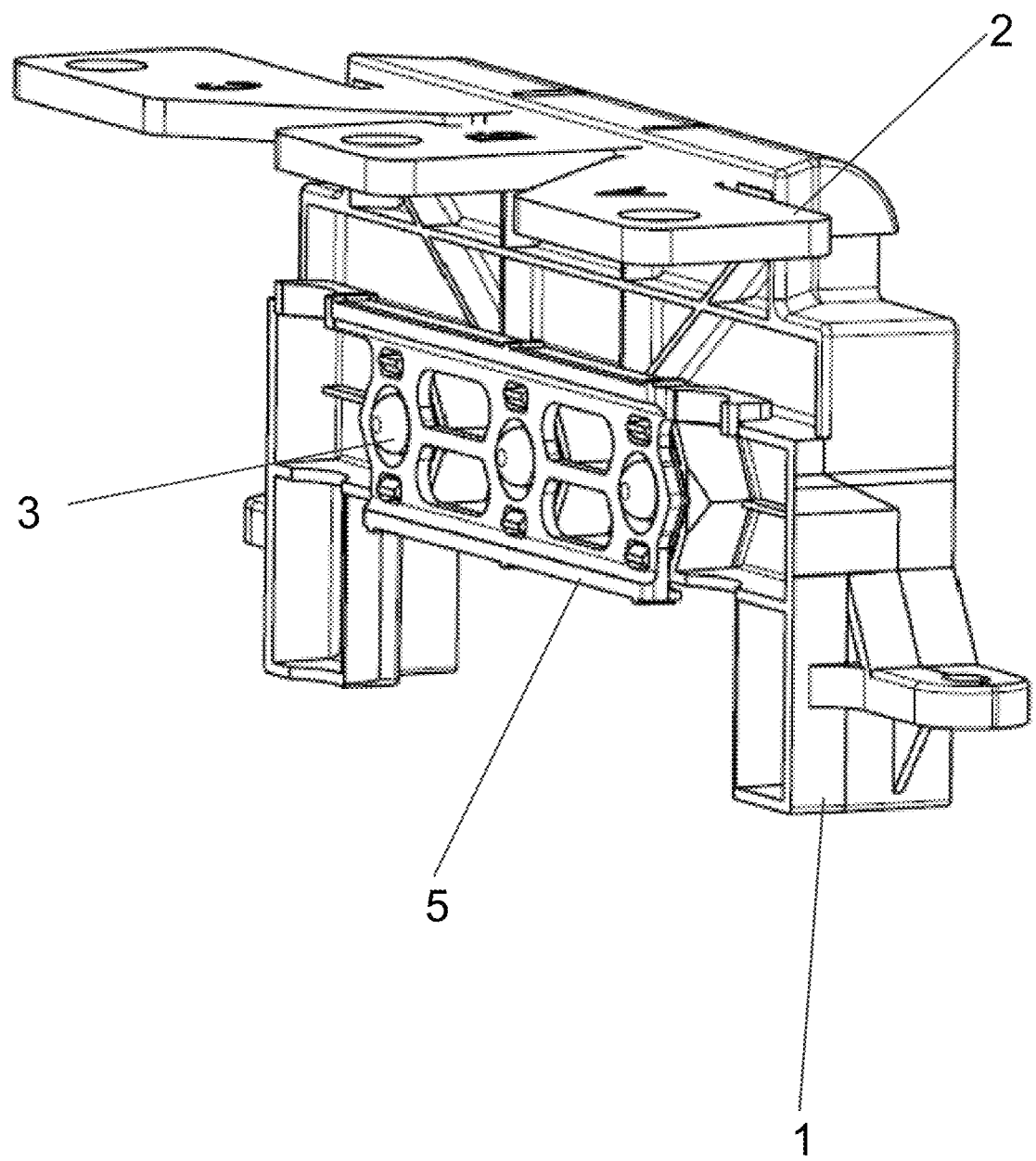
FIG. 2 is a rear isometric view of the retention system.

FIGS. 1 & 2 illustrates an assembled busbar system with retention system. A main busbar 2 is attached to a dielectric overmold 1 through a fastener assembly that includes a fastener 3 and a washer 7. The dielectric over-mold 1 serves as a basis for the busbar variable connection retention system and must be of dielectric material to prevent a short circuit of busbar to an electronic enclosure (where the busbar variable connection retention system will reside). The main busbar 2 will be molded in with the dielectric over-mold 1. This will improve rigidity for the main busbars 2 during mechanical vibrational/impact loads. The washer can be of a standard washer, a spring washer or a locking washer. The fastener 3 is disposed on the busbar and extends through a main busbar opening 8. The fastener 3 extends through a floating retention nut 4 and includes a threaded interface between the fastener 3 and the floating retention nut 4. The fastener extends through the retention nut 4 and connects to a nut retention bracket 5 configured to constrain the floating retention nut 4 within the dielectric mold 1.

Figure 3:
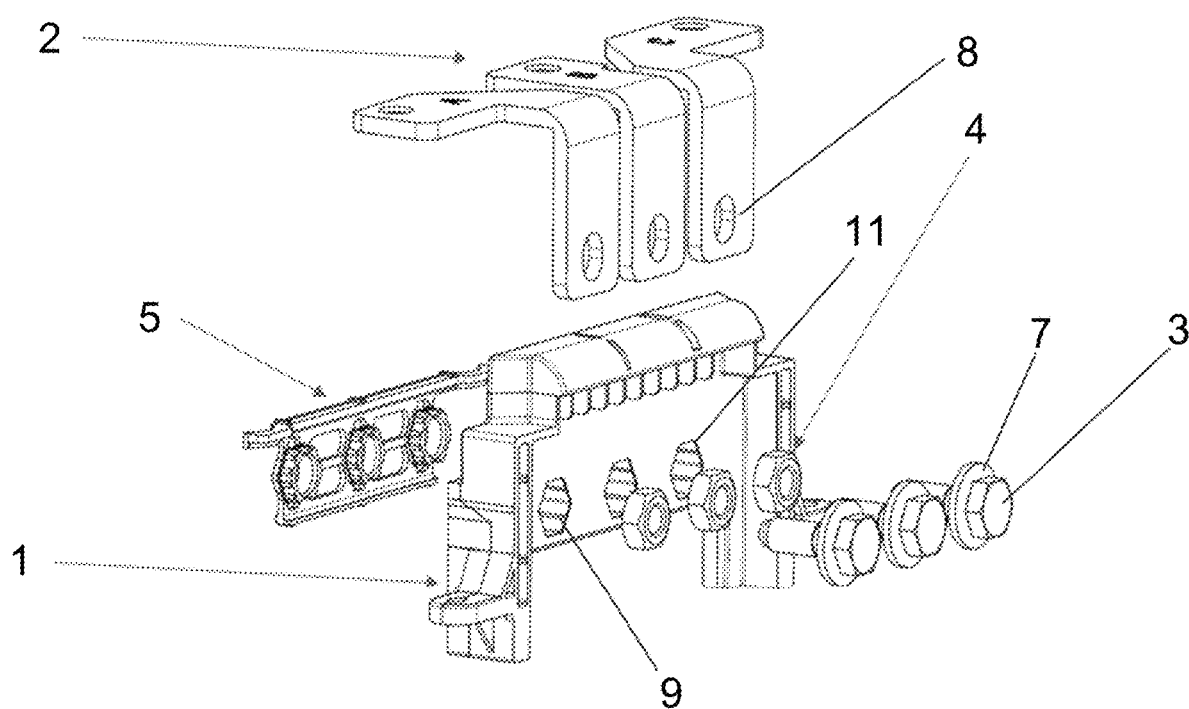
FIG. 3 is a exploded view of the retention system.

FIG. 3 shows an exploded view of the connection retention system. The number of bus bars 2 and corresponding retention system parts can vary depending on the electrical system used. The ribs 9 is disposed in the interior surface of the overmold opening 11 to lock the fastener circumferentially while allowing retention nut 4 to move axially.

Figure 4:
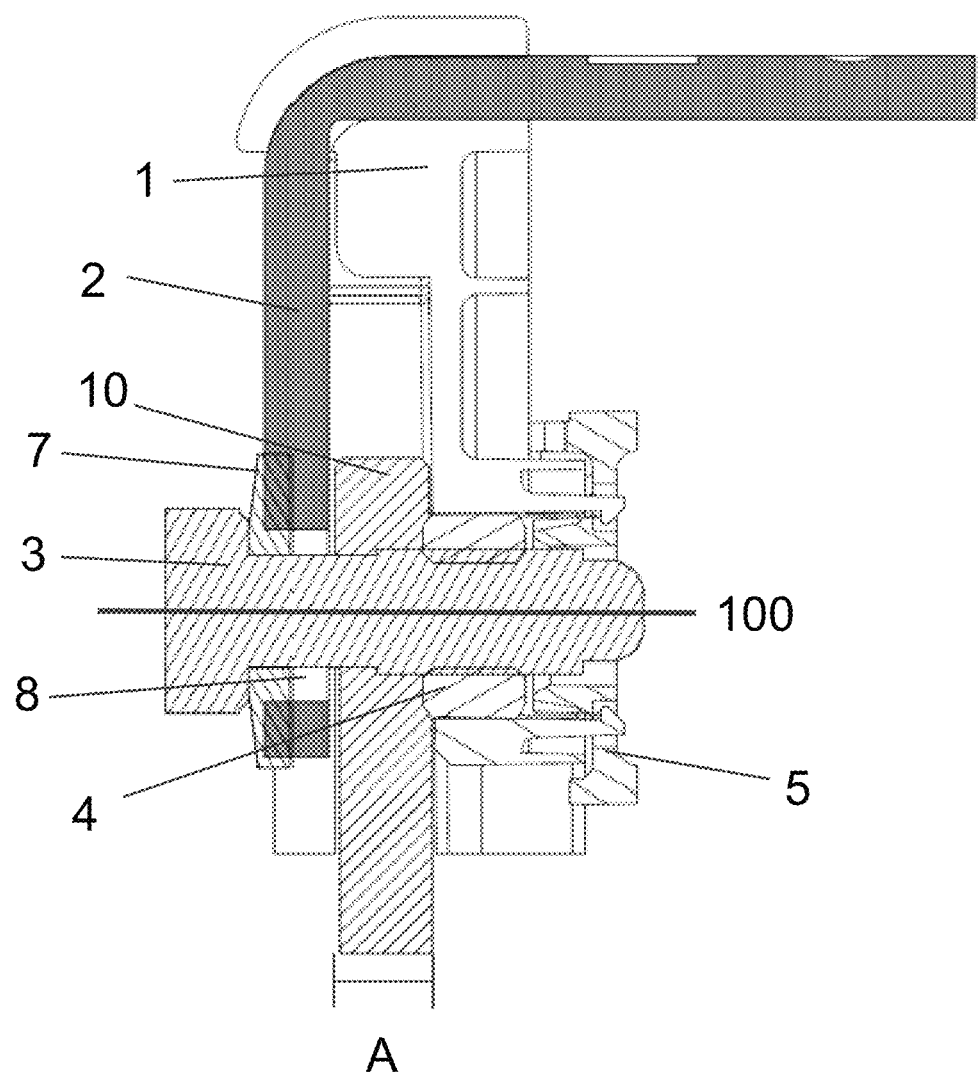
FIG. 4 is a side sectional view of the retention system with thickness A.

FIG. 4 shows a side section view of the retention system with a mating busbar 10. The main busbar 2 in the retention system are one of the two busbars required in current distribution, the second being the mating busbar 10. The mating busbar 10 has a thickness "A". The retaining fastener 3 with washer 7 and retaining nut 4 provide the retaining mechanism for the main busbar 2 and mating busbar 10. The nut retention bracket 5 prevent the retaining nut 4 from disengaging from the busbar variable connection retention system during busbar joint installation and removal. To achieve a proper clamp load for the busbars, the floating retention nut 4 will float axially to accommodate the thickness of mating busbar to reduce contact resistance at the busbar joint between the main busbar 2 and mating busbar 10. When the busbar 2 is placed into position and torque is applied to the fastener 3, the floating retention nut 4 is able to traverse axially via the axial traverse path 100 to provide planar clamping force to the main busbar 2 and mating busbar 10. The fastener 3, main bus bar opening 8, the washer 7, the floating retention nut 4 may be coaxial.

Figure 5:
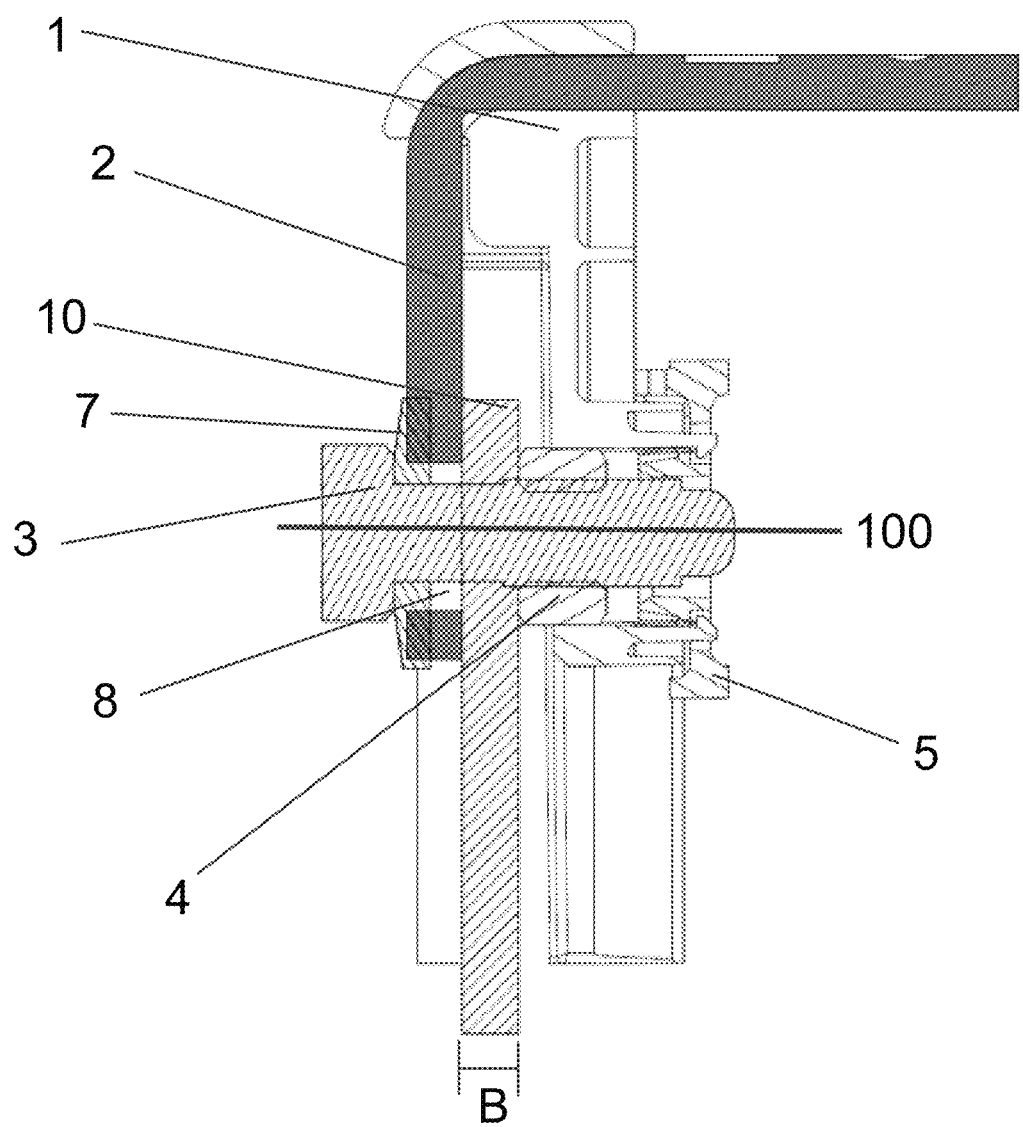
FIG. 5 is a side sectional view of the retention system with thickness B.

FIG. 5 shows an exemplary embodiment of the retention system with a mating busbar 10 with thickness "B". Both configurations shown in FIGS. 4 and 5 can be placed in same busbar retention system shown in FIG. 1. For example, one main busbar 2 of the busbars shown in FIG. 1 can have a configuration shown in FIG. 4 and another main busbar 2 can have a configuration shown in FIG. 5. In FIG. 5, the retaining nut 4 would traverse axially aft more than mating busbar in FIG. 4. The thicknesses of the primary busbars 2 and mating busbars 10 can vary. For example, all of the primary and mating busbars can be of the same thickness, or all be of different thicknesses.

Figure 6:
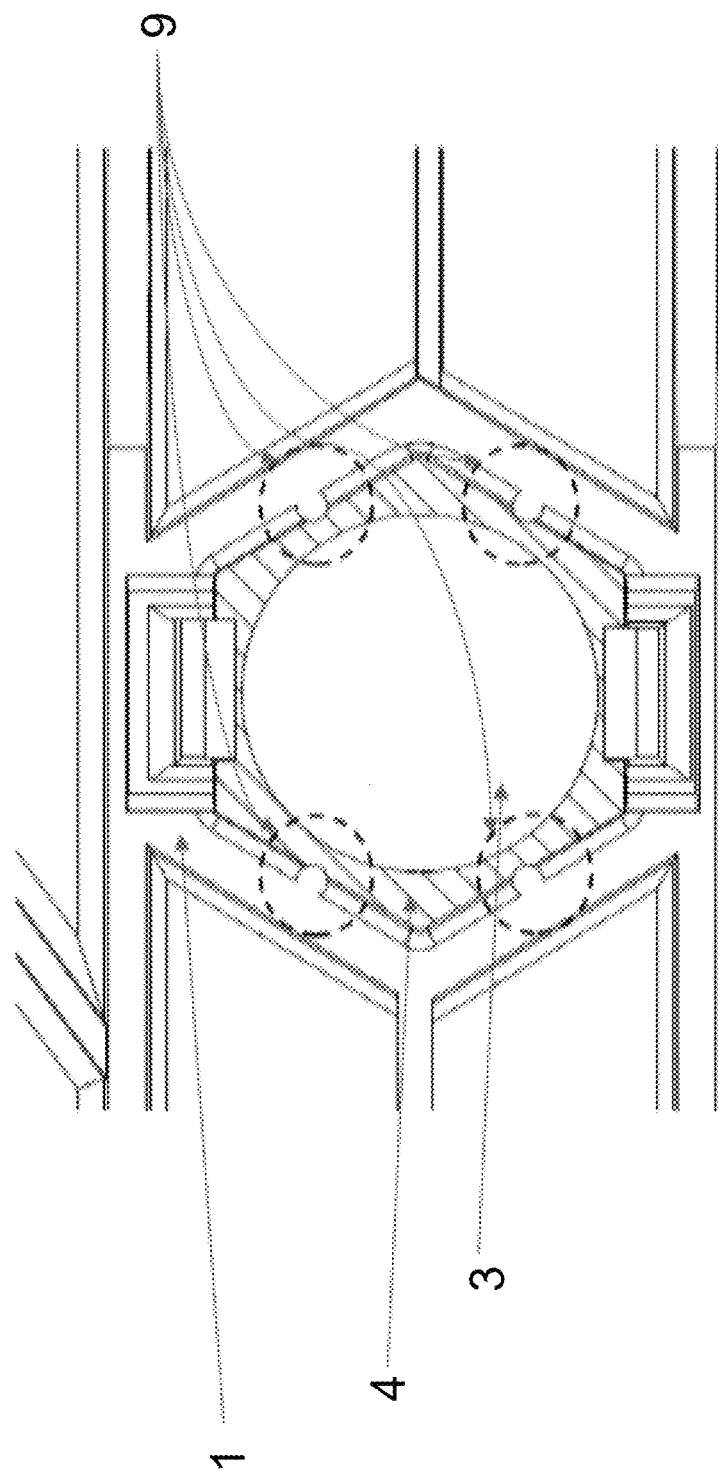
FIG. 6 is a detailed rear section view of the retention system.

FIG. 6 shows a close up view of the interface between the floating nut 4 and the overmold 1. The retaining nut 4 is radially held in position through ribs 9 located within an opening of the over-mold 1. When torque is applied to the retaining fastener 3, the interference between the ribs 9 of the over-mold will prevent the retaining nut 4 from rotating circumferentially but movement in the axial direction is achieved. This will allow the system to achieve desired clamp load on the busbar joint. Ribs 9 shown can be of any shape to provide low friction between the overmold and the floating nut 3. The number of ribs 9 can also vary depending on the requirements for the retention system such as nut size or torque requirements.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the retractor with a staged torsion bar and shift assembly as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A busbar retention system for a mating interface comprising:
    a base;
    a first mating component disposed within the base;
    a second mating component; and
        a fastener assembly configured to attach the first mating component to the second mating component, wherein the fastener assembly includes a fastener and a floating retention nut located within an opening in the base, wherein the floating retention nut is configured to be movable along the length of the fastener has a non-circular shape exterior shape and wherein the base includes a non-circular opening matching the shape of the retention nut so that the retention nut is prevented from rotating; and
    wherein the floating retention nut includes an exterior surface in contact with the opening in the base and an interior surface surrounding the fastener and wherein the opening in the base includes a plurality of axially extending inwardly projecting ribs that contact the exterior surface of the floating retention nut to thereby resist axial movement and retain the floating retention nut in position while permitting axial movement of the floating retention nut upon the application of a torque applied to the fastener resulting in an axial force applied to the floating retention nut.

2. The retention system of claim 1, wherein the second mating located component is between the first mating component and the base.

3. The retention system of claim 1, wherein the fastener assembly further includes a nut retention bracket engaged to the fastener.

4. The retention system of claim 3, wherein a torque applied configured to tighten the fastener assembly causes an axial movement of the floating retention nut.

5. The retention system of claim 1, wherein the first mating component is a main busbar.

6. The retention system of claim 5, wherein the second mating component is a mating busbar.

7. The retention system of claim 6, wherein the base is a dielectric overmold.

8. A retention system for busbars comprising:
    a dielectric base;
    a main busbar nested within the base;
    a first mating busbar;
    a first opening located on the main busbar;
    a first fastener configured to attach the main busbar to the first mating busbar, wherein the first fastener extends through the first opening;
    a first washer located adjacent to the first opening, wherein the first washer is engaged to the first fastener and the main busbar; and
    a first floating retention nut located within an opening in the base that is axially aligned with the first opening, wherein the first floating retention nut is configured to be movable along the axial length of the first fastener and maintain engagement with the first mating busbar;
    wherein first floating retention nut has a non-circular shape exterior shape and wherein the base includes a non-circular opening matching the shape of the retention nut so that the retention nut is prevented from rotating; and
    wherein the first floating retention nut includes an exterior surface in contact with the opening in the base and an interior surface surrounding the fastener and wherein the opening in the base includes a plurality of axially extending inwardly projecting ribs that contact the exterior surface of the first floating retention nut to thereby resist axial movement and retain the first floating retention nut in position while permitting axial movement of the first floating retention nut upon the application of an axial force associated with tightening of the fastener.

9. The retention system of claim 8, wherein the base is a dielectric overmold.

10. The retention system of claim 8, further comprising:
a secondary busbar;
a second mating busbar;
a second opening located on the secondary busbar;
a second fastener configured to attach the secondary busbar to the second mating busbar, wherein the second fastener extends through the second opening;
a second washer located adjacent to the second opening, wherein the second washer is engaged to the second fastener and the secondary busbar; and
a second floating retention nut within the base, wherein the first floating retention nut is configured to be movable along the length of the first fastener to engage the main busbar and the second mating busbar.

11. The retention system of claim 10, wherein the second mating busbar is thinner than the first mating busbar.

12. The retention system of claim 10, wherein a first torque applied to the first fastener causes a first axial movement of the floating retention nut towards the first busbar.

13. The retention system of claim 12, wherein a second torque applied to the second fastener causes a second axial movement of the second floating retention nut towards the second busbar.

14. A busbar assembly comprising:
a base;
a plurality of primary busbars nested within the base;
a plurality of mating busbars, wherein each mating busbar are adjacent to each corresponding primary busbar of the plurality of primary busbars;
a plurality of openings, wherein each opening of the plurality of openings are located on each corresponding primary busbar of the plurality of primary busbars;
a plurality of fasteners, wherein each fastener of the plurality of fasteners are configured to attach each of the primary busbars to each corresponding mating busbar of the plurality of mating busbars;
a plurality of floating retention nuts within the base, wherein each floating retention nut of the plurality of floating retention nuts is configured to move along the length of a corresponding fastener of the plurality of fasteners to maintain engagement with one of the plurality of mating busbars;
wherein each of the plurality of floating retention nuts has a non-circular shape exterior shape and wherein the base includes a plurality of corresponding non-circular openings and wherein each of the openings in the base matches the shape of the retention nut so that the retention nut is prevented from rotating; and
wherein the each of the floating nuts includes an exterior surface in contact with the corresponding opening in the base and an interior surface surrounding the corresponding fastener and wherein the corresponding opening in the base includes a plurality of axially extending inwardly projecting ribs that contact the exterior surface of the floating retention nut to thereby resist axial movement and retain the floating retention nut in position while permitting axial movement of the floating retention nut upon the application of an axial force associated with tightening of the fastener.

15. The assembly of claim 14, wherein the plurality of mating busbars includes at mating busbars having at least two different thicknesses.

16. The retention system assembly of claim 15, wherein the thicknesses are measured along each longitudinal axis of each fastener of the plurality of fasteners.

* * * * *